June 5, 1973 D. M. HARVEY 3,737,315
FILM CARTRIDGE AND ASSEMBLAGE
Filed Feb. 1, 1971 4 Sheets-Sheet 1

DONALD M. HARVEY
INVENTOR.

BY

ATTORNEYS

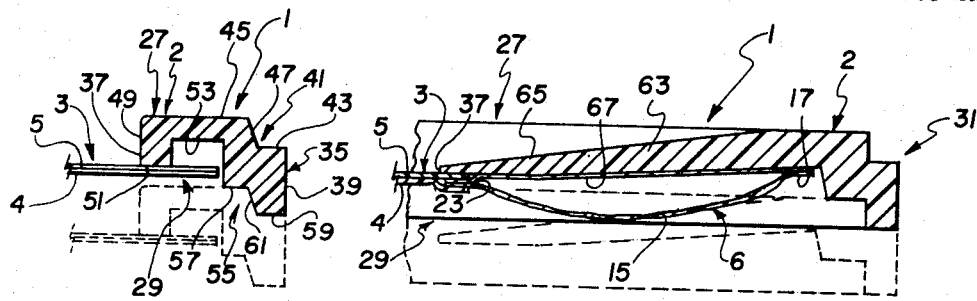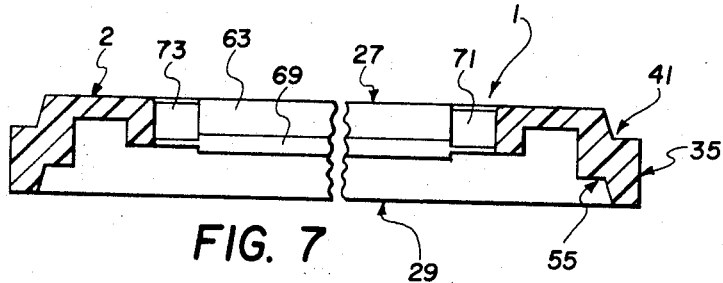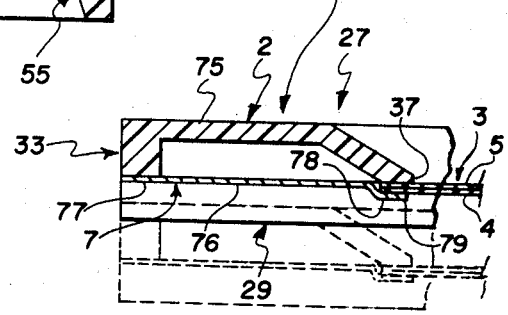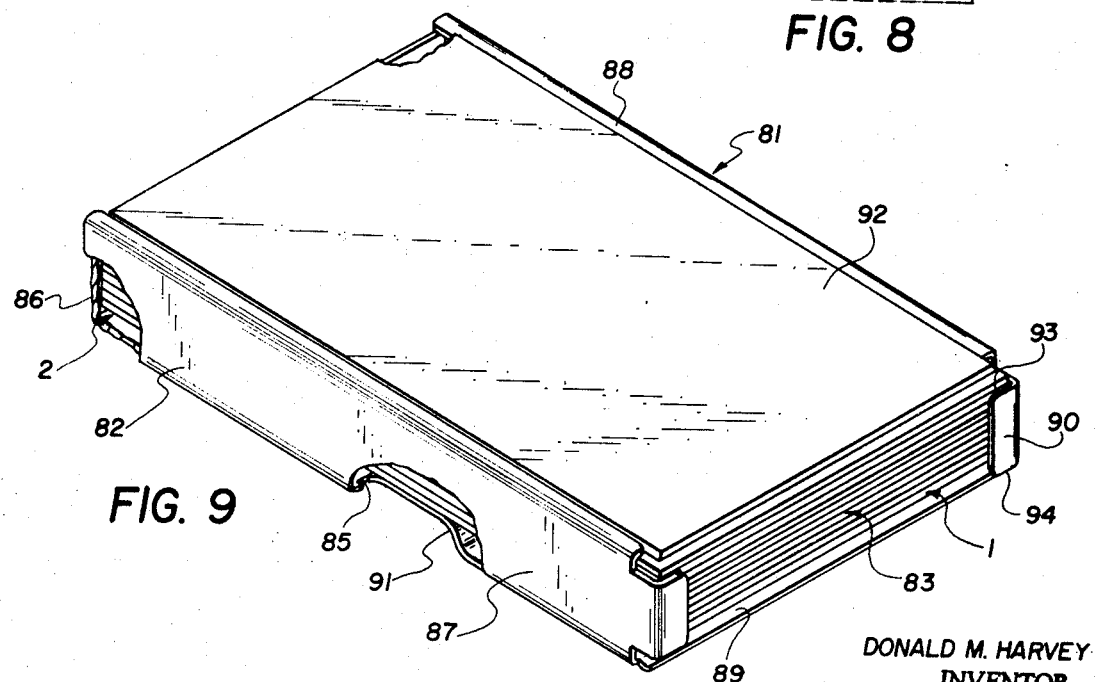

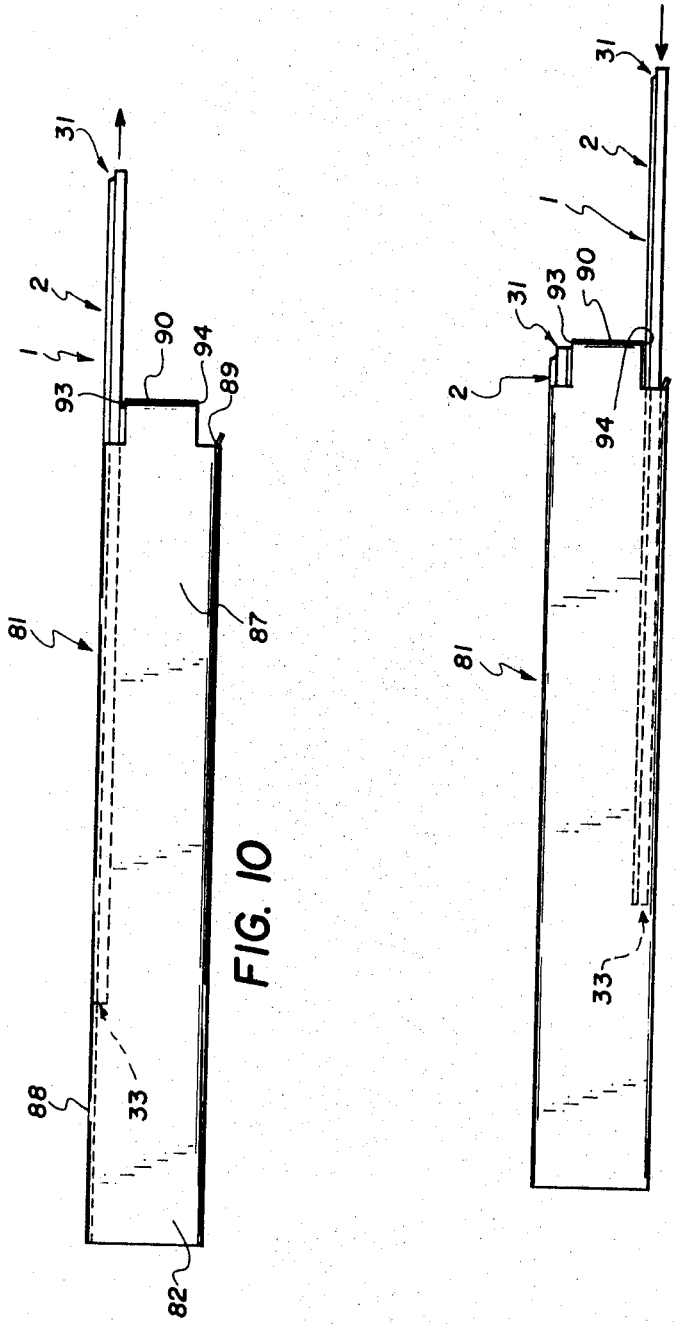

United States Patent Office 3,737,315
Patented June 5, 1973

3,737,315
FILM CARTRIDGE AND ASSEMBLAGE
Donald M. Harvey, Webster, N.Y., assignor to Eastman Kodak Company, Rochester, N.Y.
Filed Feb. 1, 1971, Ser. No. 111,466
Int. Cl. G03c 1/48
U.S. Cl. 96—76 C    8 Claims

ABSTRACT OF THE DISCLOSURE

An assemblage and cartridge for photographic film units of the self-processing type. The film units each include a preregistered, integral image-recording unit supported on a rigid frame. The assemblage is defined by a plurality of the film units, preferably with a dark or cover slide, that cooperate to provide a substantially light-tight stack from which the film units can be transported only in the proper direction and order. The uppermost film unit, or the dark slide, is removed first and its frame, preferably after removal of the image-recording unit, then can be reinserted into the stack at the bottom thereof for storage and later disposal with the other frames upon exhaustion of the pack. The cartridge cooperates with the stacked film units to facilitate their handling, to provide further light tightness, and to insure proper transporting of the film units from the back into the stack.

CROSS REFERENCE TO RELATED APPLICATIONS

Reference is made to commonly assigned copending U.S. patent applications Ser. No. 111,403, entitled Film Unit; Ser. No. 111,382, entitled Fluid Collector; Ser. No. 111,472, entitled Stripping Mechanism; and Ser. No. 111,464, entitled Film Transporting; all filed concurrently herewith in my name.

BACKGROUND OF THE INVENTION

The present invention relates to assemblages of and cartridges for photographic film units of the self-processing type, and more specifically to such film units comprising a preregistered image-recording unit supported on a rigid frame.

It is well known in the photographic arts to supply self-processing photographic film units in assemblages and cartridges, often referred to as film packs. It also is known to provide such packs with means for transporting the film units from the packs in a proper sequential order. Various types of such film packs are disclosed for example, in U.S. Patents Nos. 3,080,805; 3,511,659; 3,447,437; 3,511,152; 2,873,658; and 3,369,470; and in commonly assigned copending U.S. application Ser. No. 685,687, entitled Cartridge for Dispensing and Storing Slide Transparency units, filed on Nov. 24, 1967 in the names of H. J. Bartnick and H. Nerwin. The self-processing film units supplied in this form generally include a photosensitive element comprising a support having thereon at least one layer of photosensitive material, and a second element adapted to be registered with the photosensitive element for processing. A viscous processing composition is supplied to the unit at one end and is spread toward the other end by passing the unit between juxtaposed pressure-applying members that distribute the composition in a layer of predetermined thickness between the two elements. The distributed composition then permeates the layers of the unit to effect development of the photosensitive layers and the construction of an image in a mordant layer, either in the photosensitive or second element, to provide a substantially permanent and visible photograph.

In a presently popular commercial film unit, generally referred to as being of the "peel-apart" type, the photosensitive and second elements are spaced apart during exposure and are brought into superposition for processing. The image or print-receiving layer is in the second element, and that element is stripped from the rest of the unit after processing to provide a positive right-reading print. Such a unit is disclosed, for example, in the previously mentioned Patents No. 3,080,805 and 3,511,659. The present invention is more closely concerned with different types of film units generally referred to as being "preregistered" or "integral." The photosensitive and process elements of a preregistered film unit are superposed or registered prior to exposure, while the same elements of an integral film unit permanently are maintained in superposed or registered relationship during and after processing.

The present invention is disclosed with a film unit that is both preregistered and integral. Such a unit includes photosensitive and second elements that are superposed prior to exposure and defines a composite, permanently registered structure designed to remain substantially in the same physical form after processing. In presently known film units of this latter type, the second element is transparent, to permit exposure of the photosensitive materials from the top side of the unit, and the image or print-receiving layer is located either in the process element, or, preferably, in the photosensitive element, to provide a positive image that need not be stripped from the rest of the unit. Film units of this latter type are disclosed, for example, in commonly assigned, copending U.S. patent application Ser. No. 27,990, entitled Photographic Film Unit for Diffusion Transfer Processing, filed Apr. 13, 1970 in the name of H. E. Cole; and in French Patents Nos. 2,006,255 and 2,006,256, published Dec. 26, 1969.

The invention has particular utility with preregistered and integral film units of the type disclosed in my U.S. application Ser. No. 111,403, entitled Film Unit, filed on even date herewith, wherein the image-recording portion of the unit is mounted on a rigid plastic frame.

SUMMARY OF THE INVENTION

An object of the present invention is to provide an improved assemblage and cartridge for film units of the self-processing type, and especially such film units including a pre-registered image-recording portion supported on a rigid frame.

A further object of the invention is to provide an assemblage of film units that cooperate, preferably with a dark slide, to provide a substantially light-tight stack.

Still another object is to provide such an assemblage wherein the film units are configured and cooperate to insure their removal from the stack only in the proper order and direction.

Another object of the invention is to provide an assemblage of the above type wherein the respective uppermost film unit, or the dark slide, can be first removed from the assemblage, and then its frame, preferably after removal of the image-recording portion, can be repositioned behind the stack for storage and later disposal with the other frames after exhaustion of the film-unit supply.

An additional object of the present invention is to provide a cartridge for facilitating the handling of the above film assemblages, and for further insuring light-tightness of the assemblage as well as proper transporting of the film units from and back into the assemblage.

Another object of the invention is to provide improved means and a method for collecting and storing various film-unit parts left over as waste after processing has been initiated.

A still further object of the invention is to provide an assemblage of film units particularly adapted for handling by reciprocating mechanisms, such as claws or pushers of an associated camera.

In accordance with a preferred embodiment of the invention an improved assemblage and cartridge are provided for self-processing film units of the type including a preregistered and integral image-recording unit supported on a rigid frame. Also supported on the frame are a pod and trap, respectively, for cooperating with an image-recording portion of the film unit to supply a processing composition at one end and to any excess of the composition at the other end.

The preferred assemblage comprises a plurality of the film units, with a dark slide, that cooperate to provide a substantially light-tight pack from which the film units sequentially can be transported only in the proper direction and order for processing. The pack also is configured and arranged to permit the sequential repositioning of film units removed from the pack, or portions thereof, back into the assemblage behind the remaining film units in the pack. In accordance with one feature of the invention, image-recording portions of the film units are removed from the frame after processing of such portions has been initiated, and the frame then is reinserted into the pack for storage and later disposal with the other frames after exhaustion of the pack.

The cartridge cooperates with the film units to further facilitate their handling, and also to further insure light-tightness of the pack and proper transporting of the film units.

The invention and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which:

FIGS. 5–8 are partial cross-sectional views representing various portions of the film unit depicted in FIG. 3 when viewed from the positions identified in FIG. 3.

FIG. 9 is a pictorial view of a film assemblage and pack including a cartridge for containing the film units in accordance with the present invention.

FIGS. 10 and 11 are schematic side-elevational views depicting the manner in which the film units are removed from and repositioned in the assemblage.

DESCRIPTION OF THE PREFERRED EMBODIMENT

Because photographic film units and cameras are well known, the present description will be directed in particular to elements forming a part of, or cooperating directly with the present invention. Film and camera elements not specifically shown or described herein are selectable from those known in the art.

Figure 3:
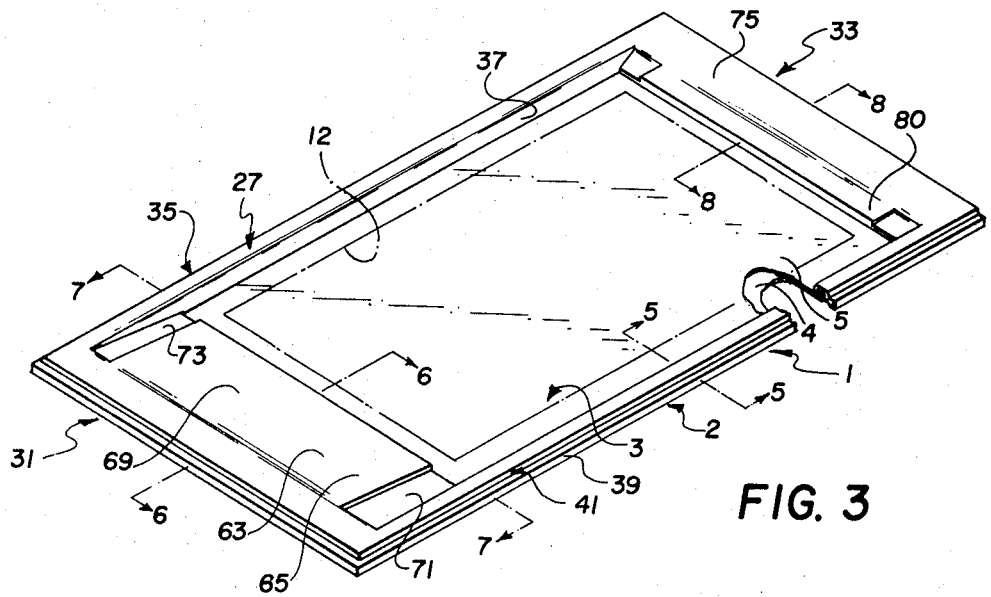
FIG. 3 is a perspective view of one film unit comprising a portion of the assemblage, illustrating the film unit from the top or exposure side thereof with a part broken away to more clearly show various elements of the unit.
Figure 4:
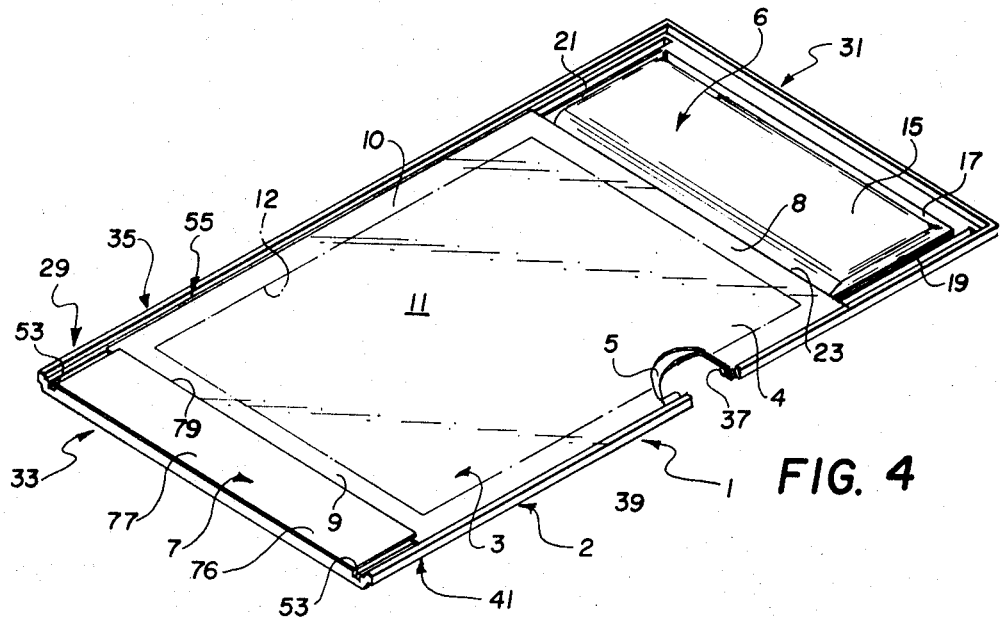
FIG. 4 is a perspective view of the film unit depicted in FIG. 3 but illustrating the unit from the bottom or opposite side thereof.

Referring now to the drawings, and particularly to FIGS. 3 and 4, a preferred embodiment of a film unit useable with the present invention is illustrated comprising a rigid frame 2; an image-recording portion of unit 3, including photosensitive and process elements 4 and 5, respectively; a pod or container 6 for supplying processing composition to the recording portion; and a trap or collector 7 for receiving any excess of the composition.

The photosensitive and process elements 4 and 5 accurately are constructed to define sheets having straight edges, square corners and appropriate borders, and properly are registered during manufacture, to provide a uniformly flat, aesthetically pleasing structure that will maintain its integrity after processing. Except for the pod, trap and frame, included in the more comprehensive structure to be described hereinafter, the image-recording unit is intended to be supplied with all parts necessary for processing by the intended apparatus, and all such parts permanently are retained together without adversely effecting the finished print.

The frame 2 supports image-recording unit 3 with the pod 6 and trap 7 coupled to the recording unit for discharging a suitable processing composition between the elements at one end of the recording unit and for collecting any excess of the composition from between the elements at the opposite end thereof. The frame is particularly adapted for convenient handling of the entire film unit 1 from the final stages of manufacture to completion of the finished print and disposal of any processing waste material. Various other functions of the frame will become more apparent from the following detailed description.

The pods 6 and trap 7 permanently are secured to the frame, but only releasably are coupled to the image-recording unit 3. Similarly, the image-recording unit is only releasably or strippably coupled to the frame. As will become more apparent hereinafter, such an arrangement of permanent and releasable couplings permits stripping after processing of the image-recording unit (then defining the finished print) from the frame, pod and trap. The latter three elements, comprising waste material after processing has been initiated, then can be collected in one packet, preferably by their reinsertion behind the other film units in the pack, and can be discarded after exhaustion of unexposed film units in the pack with little possibility of damage to any sensitive environment (e.g. clothing or person) by any remaining processing composition in the waste material.

IMAGE-RECORDING UNIT (PHOTOSENSITIVE ELEMENT AND PROCESS SHEET)

In a preferred form, photosensitive element 4 comprises a substantially flat, resilient support of transparent cellulose triacetate film base, illustrated in FIG. 4 as defining a first or leading end 8, a second or trailing end 9, lateral edges 10 and a central portion 11. At least the latter central portion supports respective layers of image-receiving material, opaque reflecting material, and a silver-halide emulsion with associated dye-image providing material. Such layers preferably are arranged in the sequence given, with the support located near a first or outside face (the face visible in FIG. 4), where it can protect that side of the unit, and the silver-halide emulsion located near the opposite or inside face, where it is protected by the process sheet 5. As will become more apparent hereinafter, the silver-halide emulsion is adapted to be exposed through the process sheet, from the top side of the unit, and the developed print is adapted to be viewed through the transparent support, from the bottom side of the unit.

The photosensitive element further includes appropriate means depicted schematically as a border or margin 12 that extends entirely around the circumferential portions of the element. Such border or margin provides a sharp boundary defining both an exposure frame within which the latent image is adapted to be recorded, and a print frame that preferably is white and within which the finished print is adapted to be formed.

The process sheet or second element 5 also preferably is formed of a transparent material, such as cellulose triacetate film base, and defines a resilient, substantially flat sheet having leading and trailing ends, lateral edges, and a central portion corresponding to equivalent parts of the photosensitive element. In addition to its function in spreading the processing composition, to be described more fully hereinafter, the transparent process sheet protects the top side of the photosensitive element and film unit while permitting the above-mentioned exposure of the silver-halide emulsion.

Photosensitive element 4 and process sheet 5 preferably are coextensive with one another, and can be maintained in registered or superposed facing relationship by any permanent seal or connection to define the image-recording unit 3. Preferably the connection extends in a longitudinal direction at the lateral edges of the recording unit from its leading end to its trailing end. The resulting connection should be sufficiently impervious to the processing composition to prevent its premature escape from the lateral edges of the unit during processing.

Regardless of the particular type of seal or connection, or its particular manner of application, the photosensitive and process elements are secured substantially in direct contacting relationship, or the equivalent, at lateral marginal edge portions and in such a manner that the central portions of the elements are retained in registered overlying relationship. As will be described more fully hereinafter, however, the leading and trailing ends and the central portions of the elements are resiliently separable, to permit the introduction, spreading and collection of the processing composition.

Additional features and advantages of this preferred image-recording unit are illustrated and described more fully in my copending U.S. application Ser. No. 111,403, entitled Film Unit, filed on even date herewith.

COMPREHENSIVE FILM UNIT (INCLUDING FRAME, POD AND TRAP)

The image-recording unit described above, comprising the photosensitive element 4 and process sheet 5, particularly is adapted to cooperate with various elements of the more comprehensive film unit 1 with which it has been illustrated. The latter unit includes the supporting frame 2, the container or pod 6, and the excess fluid collector or trap 7, all of which cooperate for recording and developing a latent image when used with the intended apparatus.

Figure 2:
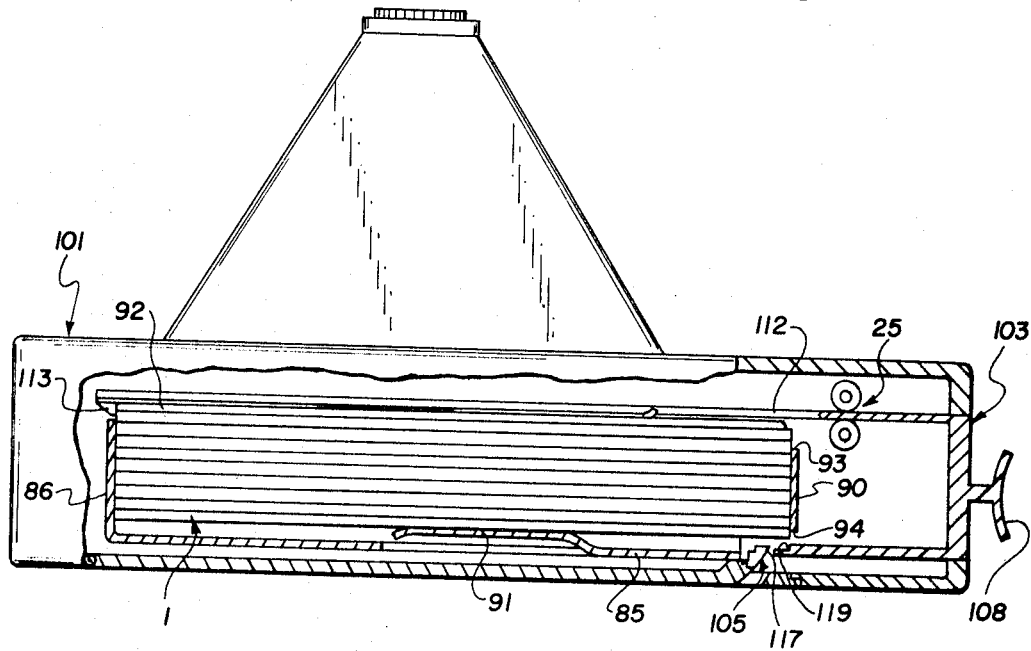
FIG. 2 is a side-elevational view of the camera illustrated in FIG. 1 with portions thereof broken away to depict the preferred assemblage and cartridge of the present invention in operative position in the camera.

The container or pod 6 can include various cooperating parts, together defining a suitable processing-composition supplying mechanism, and preferably including a rupturable containing part 15 generally comprising a rectangular blank of a vapor impervious material that is folded along a first side edge 17 and is securely sealed or closed along its ends 19 and 21. A second side 23, opposite from the folded side, is provided along substantially its entire length with a rupturable seal adapted to release a fluid composition from the container upon the application of hydraulic forces generated by passing the container between a pair of juxtaposed pressure-applying members, such as rollers 25 (FIG. 2). The containing part is coupled to or cooperates with a leading end of the image-recording unit in any suitable manner for discharging its fluid content between the photosensitive element and process sheet, and for this purpose has been illustrated with lips inserted into a space or slot provided between the photosensitive element and process sheet at the leading end of the image-recording unit.

The supporting frame 2 is most clearly illustrated in FIGS. 3–8 and comprises a substantially rigid but slightly flexible opaque material, such as black styrene plastic, that has been molded, stamped or otherwise formed to provide a substantially planar and integral rectangular supporting structure for carrying the image-recording unit 3, pod 6 and trap 7. The frame defines a first exposure or top side 27 (FIG. 3), a second bottom side 29 (FIG. 4), leading and trailing end portions 31 and 33, respectively, and lateral edge portions or rails 35 extending between and connecting the end portions. As will be described more fully hereinafter, the image-recording unit, pod and trap are adapted to be supported on the second or bottom side of the frame, and exposure of the recording unit from the top side is permitted by an exposure aperture 37 defined by the end and edge portions and extending entirely through the frame from top to bottom.

Referring to FIG. 5, depicting a cross-section of the lateral edge portions 35, the frame includes irregular or stepped surfaces including a vertical outer edge 39, defining the outermost width dimension or circumference of the film unit; a first top or exposure-side step 41, including lands 43 and 45 connected by an incline 47; a vertical inner edge 49, defining the exposure aperture; a flat film supporting surface 51, a guide or stripping slot 53, adapted to cooperate with related photographic apparatus described hereinafter; and a second bottom-side step 55 including first and second lands 57 and 59 connected by an incline 61. At least the stepped portions 47 and 55 are provided with complementary configurations that facilitate the stacking of a plurality of such film units in a compact manner that permits relative movement between adjacent stacked units only in the longitudinal direction. Additionally, the cooperating steps of adjacent film units provide a labyrinth type of light seal to prevent premature exposure of the image-recording unit.

A cross section of the leading end portion 31 of the frame 2 is depicted in FIG. 6 and comprises various edge and stepped surfaces substantially identical in configuration and for substantially the same purposes as described above. Additionally, however, the leading end portion includes a tapered and inclined ramp 63 including a first exposure side or top surface 65, and a second bottom surface 67 for supporting the pod 6. As illustrated more clearly in FIGS. 3 and 7, one or both sides of the ramp 63 include a raised shim 69 and stepped guiding channels or surfaces 71 and 73 for purposes to be described more fully hereinafter.

Referring now more specifically to FIGS. 4 and 8, the trap or excess-fluid collector 7 generally comprises a first or rigid part 75 for establishing a rigid collecting void or chamber, and a flexible part 76 for covering and enclosing the first mentioned part. The rigid part is defined by and formed as a portion of the frame, and includes circumferential walls that terminate in flat surfaces 77 extending around all four sides of the rigid portion and lying substantially in a single plane. The surfaces 77 along one side 78 (FIG. 8) of the frame are adapted to support one end of the image-recording unit, as will become more apparent hereinafter, while such surfaces on the other three sides of the trap are adapted to support the above-mentioned flexible cover portion of the trap. The cover portion may be formed from any suitable material such as kraft paper and is permanently attached to the trap surfaces 77 by a suitable adhesive or seal having sufficient wet strength to prevent the escape of any excess processing composition collected in the trap. Preferably, however, one or more small apertures or holes may be provided through the adhesive or through some other portion of the trap to permit the escape of air from the image-recording unit and from the trap as the processing composition is spread and the trap is filled. The leading portion 79 of the flexible trap cover 76 is left unadhered to the rigid portion 75 and is adapted to overlie the trailing end of the image-recording unit to enclose or confine that trailing end in a manner insuring that all of the excess processing composition expelled from the recording unit will be directed into the trap. Since there is no permanent connection between the trap and the image-recording unit, the unit easily can be withdrawn from the trap after processing has been initiated. A cross section of the trailing end portion of the frame is depicted in FIG. 8. It should be noted that a shim 80 (FIG. 3) and guide slots may be provided that are similar to the corresponding surfaces 69, 71 and 73, respectively, at the leading end portion of the unit. It should also be noted, as most clearly illustrated in FIG. 4, that the stripping or guide slots 53 extend to the very end of the frame 2, also for reasons that will become more apparent hereinafter.

As most clearly depicted in FIGS. 3–6, the frame defines a thickness (between its substantially planar top and bottom surfaces 45 and 59) that has sufficient depth to completely enclose and protect the image-recording unit 3, pod 6 and trap 7, against undesirable engagement and crushing or scratching by adjacent film units, or by elements of a cooperating film cartridge or photographic apparatus.

As briefly mentioned above, the image-recording unit 3 is releasably or strippably coupled to the frame 2. Such a coupling can be provided by the interlocking relationships between the pod 6, the trap 7 and the ends of the film unit. Preferably, however, the film supporting surfaces 51 that extend longitudinally of the frame adjacent the lateral edges of the film unit are provided with an appropriate adhesive, cohesive or seal that maintain the image-recording unit in a substantially flat condition on the frame. Additionally, the adhesive can be used to maintain a light-tight connecting relationship between the image-recording unit and the frame to render the film unit insensitive to light impinging thereon from the bottom side thereof. In this connection it will be remembered that the bottom side of the photosensitive element engaging the film supporting surfaces 51 is not exposable because of a previously mentioned opaque layer. In a similar manner the leading end portions and the lateral edge portions of the frame prevent exposure of the image-recording unit from light impinging on the film unit at its end and edges. Thus the image-recording unit is substantially protected from exposure except from its first exposure or top side illustrated in FIG. 3.

In a somewhat similar manner, the pod 6 and flexible portion of the trap 7 are permanently attached to the leading and trailing ends of the frame by an adhesive, cohesive or seal that is permanent in nature.

The pod and trap also are releasably coupled to the image-recording unit 3. However, such coupling preferably is only functional. For example, lips 23 on the pod may be inserted between the photosensitive and process elements 4 and 5 at a leading end thereof, while trailing ends of the photosensitive and process elements may be inserted between similar lips 79 of the trap. In such case, no adhesive, cohesive or separate sealing means is required.

FILM ASSEMBLAGE AND PACK

Referring now more specifically to the details of the present invention, the film units are adapted to be supplied in a pack 81 (FIG. 9) including a clip or container 82 for receiving an assemblage 83 of the film units. The container may be formed from a single sheet of metal that is stamped in the proper configuration and bent to form a bottom wall 85, a trailing end wall 86, and side walls 87. The side walls then can be folded or bent over at 88 to provide locating and restraining channels that cooperate with steps in the frame 2 for maintaining the forwardmost film unit in a proper exposure position when the cartridge is received in a cooperating camera and for assisting in guiding the film unit along a proper path of withdrawal from the assemblage or pack. Additionally, the side walls are bent over at their leading ends to form an inclined guiding surface 89 for purposes to become more apparent hereinafter, and abutment or control surfaces 90. The bottom wall of the cartridge also may be provided with resilient means such as a bent-up spring 91 for engaging and urging the film units toward the forwardmost position in the cartridge. In this connection it should be remembered that the number of film units (or frames) in the cartridge remains substantially constant, since the used frames generally are replaced after the processing of each exposed film unit has been initiated. Thus, the spring need exert a constant force only within a small range of physical locations and its design concomitantly can be simplified.

The film assemblage 83 includes a plurality of the film units 1 and a dark slide 92 having a configuration similar to that of the film units but with a solid opaque center instead of the exposure aperture 37. When in such a stacked relation, and as briefly mentioned above, the image-recording units are protected against exposure from the bottom side, from the lateral edges, and from the leading end by the opaque layer in the photosensitive sheet and by the opaque frame. Additionally, the film units are protected from the top side by the dark slide 92 and from the trailing end by the back wall 86 of cartridge 82.

The pack is particularly constructed to permit sliding removal of the respective forwardmost film unit, or the dark slide, by associated camera mechanisms, while also insuring that such removal is in the proper direction and order. This function is accomplished by two somewhat separate but related mechanisms, one provided by cooperation of the film units with each other, and the other provided by cooperation between the film units and the cartridge casing. Referring first to the film units, and as briefly described above in connection with FIGS. 5–8, it should now be apparent that the stepped lateral frame surfaces 39 through 59 cooperate to substantially prevent relative movement between the stacked film units except in the longitudinal direction (i.e. the direction defined between the leading and trailing ends of the film units, or right-to-left in FIG. 2). Similarly, the stepped surfaces at the leading end of the units prevent removal of lowermost film units in the stack until the uppermost film units are removed. Referring next to the pack and to FIG. 9, it also should now be apparent that the side walls 87 of the cartridge and the abutment surfaces 90 in the forward cartridge wall, cooperate with the film units to further constrain movement of the units, except for the desired longitudinal sliding movement of the forwardmost unit.

After a film unit has been withdrawn from the pack, and as briefly mentioned above, the image-recording portion thereof can be stripped from the frame and the frame can be reinserted into the back of the cartridge in a manner similar to that described above in connection with its withdrawal. Again, the stepped surfaces on the film units, and the abutment surfaces 90 on the cartridge casing, insure proper longitudinal sliding movement of the units back into a proper position in the pack.

PHOTOGRAPHIC APPARATUS FOR USE WITH FILM UNIT

Figure 1:
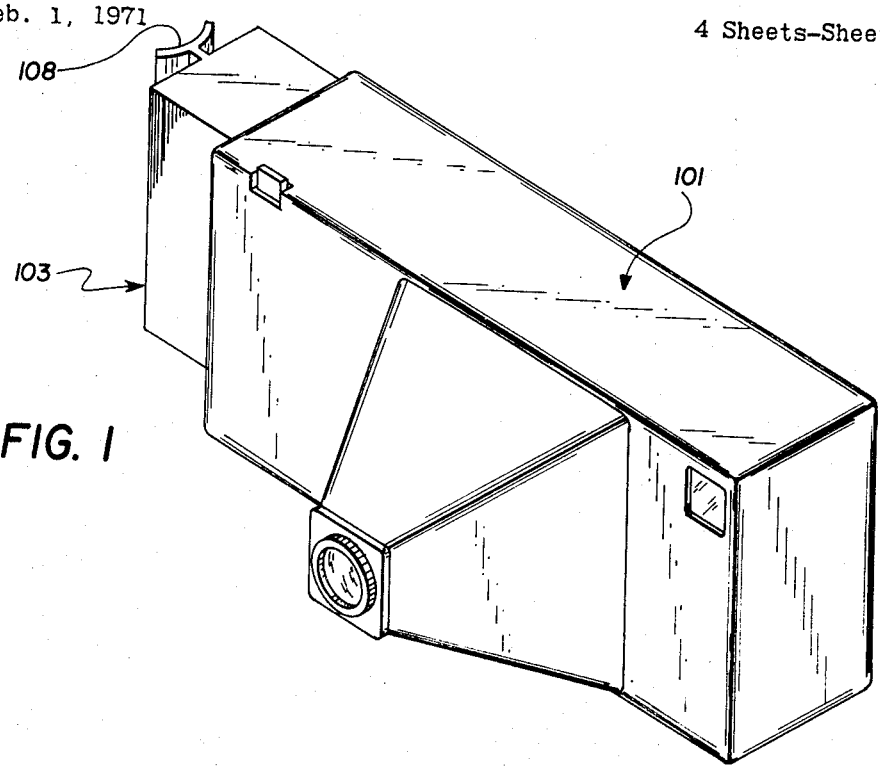
FIG. 1 is a pictorial view of a camera particularly adapted for use with assemblage and cartridge of the present invention.

The film unit and pack can be used in photographic apparatus such as the camera depicted in FIGS. 1 and 2, comprising a body portion 101, the juxtaposed pressure-applying members 25, a film transporting mechanism 103 and a stripping mechanism 105. As most clearly illustrated in FIG. 2, the film transporting mechanism generally comprises a slidable drawer or chucker including a handle 108 accessible from the camera exterior for reciprocating the chucker between a first closed position within the camera, as illustrated in FIG. 1, and a second open position withdrawn from the camera (not shown). At its upper portion the chucker includes elongated arms 112 from which extend hooks or claws 113. As the chucker is moved in a first direction, from its closed position to its opened position, the claw 113 engages the trailing end of the forwardmost film unit and transports that unit between the pressure-applying rollers 25 and from the camera body.

The pressure members preferably are of the stepped type illustrated and described in commonly assigned copending U.S. application Ser. No. 70,836, entitled Film Unit, and filed on Sept. 9, 1970, in the name of H. Nerwin. In operation, raised shoulder portions 115 on the pressure members are adapted to ride on the marginal portions of the film unit as the unit is pulled between the members, while recessed central portions of the members simultaneously are adapted to rupture the container and spread the processing composition in a uniform layer.

As the fluid processing composition is expelled from the container and distributed between the photosensitive and process elements, hydraulic forces in the composition will separate the resilient elements in their central portions and force them into engagement with the central portions of the pressure members. The height of the central recess in the members determines and is selected to spread the composition in a layer of proper initial thickness (approximately .006 inch).

As the processing composition is distributed, it immediately begins to permeate the various layers of the photosensitive element to initiate processing in a manner more fully described in commonly assigned, copending U.S. application Ser. No. 27,990, entitled Photographic Film Unit for Diffusion Transfer Processing and filed on Apr. 13, 1970 in the name of H. E. Cole. Additionally, various components for the processing composition, including water, begin to escape or dissipate entirely through or otherwise from between the photosensitive and process elements to the surrounding atmosphere, resulting eventually in a drying of the processing composition. The composition comprises only a very small percentage of solids (e.g. less than five percent), and most of the rest of the composition (essentially water) eventually escapes from between the elements. As a result, forces holding the photosensitive and process elements apart are relieved and the resiliency of the elements effects their return to facing engagement. By this time the image-recording unit again has assumed its original uniform flat configuration.

After processing has been initiated, the image-recording unit 3 is particularly adapted to be stripped from the frame 2, pod 6 and trap 7, by the stripping mechanism 105 of associated photographic apparatus. This mechanism comprises a pair of spaced fingers or skiving surfaces 117 that are configured to mate with and slide in the stripping slots 53 of the film unit, both for guiding movement of the film unit through the stripping mechanism, and for entering between the image-recording unit and the frame to skive or pry the recording unit from the frame. Complete separation is facilitated by the flexible nature of trap portion 76, that permits the leading end of the trap to flex upwardly away from the frame as the recording unit is separated from the frame. Separation of the recording unit from the pod is accomplished in a similar manner, and the completely separated recording unit is guided by appropriate camera surfaces through an appropriate aperture in the camera body and to a position where it is accessible from the exterior of the apparatus.

The pod and trap, however, are not as wide as the recording unit and do not extend over the stripping slot in the rigid frame. Therefore, the stripping fingers will move between and past the stripping fingers without being engaged or stripped thereby.

OPERATION OF THE PREFERRED EMBODIMENT

The operation of the preferred assemblage and cartridge are most clearly illustrated in FIGS. 1 and 9–11. FIG. 10 depicts the assemblage of film units stacked in a light-tight manner in the cartridge casing, with the forwardmost unit in position for withdrawal.

FIG. 10 depicts the forwardmost unit during its sliding and longitudinal withdrawal from the assemblage over abutment surface 90. During this withdrawal of the forwardmost film unit, the next successive film unit is restrained against movement by its blocking engagement with the abutment surface 90, which engagement is maintained until the preceding film unit is completely withdrawn and the next successive unit is moved to the forwardmost position by springs 91.

After the unit has been withdrawn from the camera and completely from between the pressure-applying members, it drops from its raised position in the chucker adjacent a forward portion of the camera body, to a lowered position in the chucker adjacent the rearwardmost portion of the camera body. The unit is held in this lowermost position by a catching surface or wall 119 at one end of the chucker and a similar surface in the camera body (not shown). Thereafter, the chucker is moved in a second direction from its open position to its closed position, to push the film unit back into the container 82 behind the previously exposed or unexposed film units remaining therein. Simultaneously therewith the stripping fingers located in the camera back enter stripping slots or guides 53 in the lateral edges of the film unit and are moved between the frame and film unit in a skiving manner to strip or separate the image-recording unit from the frame. As the recording unit is separated from the fame it is guided by cooperating surfaces of the stripper or camera back and is directed through an aperture in the camera body to a position where it is accessible to the camera operator. The frame, pod and trap, on the other hand, are returned to and retained in the cartridge for disposal with the other frames, pods and traps after they also have served their purpose in processing their related film units.

It should now be apparent that an improved film assemblage and cartridge, for use with film units of the self-processing type, have been provided that are particularly well adapted for convenient handling of the film units. While the assemblage normally includes or cooperates with a cartridge casing, the film units themselves, and the dark slide, are particularly adapted to cooperate in defining a substantially light-tight stack in which the units are significantly constrained from movement except in the proper order and direction. The assemblage provides an especially convenient mechanism for collecting either entire exposed and process film units, or only processing waste materials left after the picture recording portions of the units are removed therefrom. In the latter case the waste material easily is disposable in pack form without contamination of the person or environment. The cartridge casing cooperates with the stacked film units, and complements and further insures that the above effects are accomplished, while additionally facilitating the contamination free handling of the film units both within and outside the camera.

It also should be apparent that the assemblage and cartridge are unusually simple in manufacture and operation, and present a clean or uncluttered appearance, while still being conducive to a variety of diversified operations that can be carried out accurately and free from substantial risk of malfunction. By way of example only, and in addition to the camera mechanism briefly described above, the film units manually could be withdrawn and reinserted into the pack. Similarly, it should be recognized that the structure is greatly simplified by providing a one-piece cartridge casing and a single cartridge chamber that serves the two functions of storing both unexposed units and used frames or processing waste material.

Other features and accompanying advantages are set forth in the preceding description, and/or now should be apparent from the above description to those skilled in the art.

The invention has been described in detail with particular reference to a preferred embodiment thereof, but it will be understood that variations and modifications can be effected within the spirit and scope of the invention.

I claim:

1. An assemblage of self-processing photographic film units comprising first and second adjacent film units each defining lateral edges; the improvement comprising:

means formed by the lateral edges of the first film unit for defining first surfaces, and means formed by the lateral edges of the second film unit for defining second surfaces, the first and second surfaces, being substantially congruent and arranged to mate in a light-tight manner.

2. The invention claimed in claim 1 wherein the first and second surfaces each define stepped configurations.

3. The invention claimed in claim 2 wherein the stepped configurations each include first and second substantially parallel lands interconnected by means defining a connecting surface substantially perpendicular to said lands.

4. An assemblage of self-processing film units, the assemblage comprising first and second film units stacked in adjacent contacting relationship, said first film unit defining a plane having a longitudinal dimension, the improvement comprising:
means defined by said first and second film units for cooperating to prevent relative movement between said first film unit and said second film unit in a direction transverse to and in the plane having the longitudinal dimension of said first film unit.

5. The invention claimed in claim 4 wherein said first and second film units define lateral edges, and wherein the lateral edges of said first film unit contact the lateral edges of said second film unit to provide a light-tight seal therebetween.

6. The invention claimed in claim 4 wherein said film units each include a rigid frame, and said means comprises longitudinally oriented stepped surfaces defined by said frames.

7. A stack of self-processing film units, the stack comprising first and second adjacent film units each defining a plane, the improvement comprising:
means on said first and second film units for cooperating to permit sliding relative movement of said first unit relative to said second unit only along one axis.

8. The invention as claimed in claim 1 having means coupled to each of the film units for cooperating to prevent the withdrawal of the film units in the lower portion from the leading end until the film units in the upper portion have been withdrawn.

References Cited

UNITED STATES PATENTS

| | | | |
|---|---|---|---|
| 3,607,279 | 9/1971 | Gold | 96—76 C |
| 3,607,283 | 9/1971 | Gold | 96—76 C |
| 3,595,661 | 7/1971 | Gold | 96—76 C |
| 3,582,335 | 6/1971 | Erlichman | 96—76 C |

NORMAN G. TORCHIN, Primary Examiner

J. L. GOODROW, Assistant Examiner

U.S. Cl. X.R.

96—29 R